US012289580B2

(12) United States Patent
Yueh et al.

(10) Patent No.: US 12,289,580 B2
(45) Date of Patent: Apr. 29, 2025

(54) ELECTRONIC DEVICE

(71) Applicant: Innolux Corporation, Miaoli County (TW)

(72) Inventors: Jui-Jen Yueh, Miaoli County (TW); Kuan-Feng Lee, Miaoli County (TW); Tsung-Han Tsai, Miaoli County (TW); Shun-Cheng Chen, Miaoli County (TW); Ting-Wei Liang, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 199 days.

(21) Appl. No.: 18/085,553

(22) Filed: Dec. 20, 2022

(65) Prior Publication Data

US 2023/0232162 A1 Jul. 20, 2023

(30) Foreign Application Priority Data

Jan. 17, 2022 (CN) ......................... 202210051284.1

(51) Int. Cl.
*H04R 17/00* (2006.01)
*H04R 1/02* (2006.01)
*H04R 1/28* (2006.01)
*H04R 1/34* (2006.01)

(52) U.S. Cl.
CPC ............. *H04R 17/00* (2013.01); *H04R 1/028* (2013.01); *H04R 1/288* (2013.01); *H04R 1/345* (2013.01); *H04R 2499/15* (2013.01)

(58) Field of Classification Search
CPC ........ H04R 17/00; H04R 1/028; H04R 1/288; H04R 1/345; H04R 2499/15; H04R 7/06
See application file for complete search history.

(56) References Cited

U.S. PATENT DOCUMENTS 7,565,949 B2 * 7/2009 Tojo ...................... G06F 1/1605 181/171
10,045,126 B2 * 8/2018 Berger ..................... H04R 7/20
11,070,899 B2 7/2021 Hsiao et al.
11,596,980 B2 * 3/2023 Kho ...................... B06B 1/0622
12,003,905 B2 * 6/2024 Kim ...................... H04R 1/025
(Continued)

FOREIGN PATENT DOCUMENTS

CN 104461115 3/2015
CN 111710292 B * 11/2021 ............... G09F 9/33
(Continued)

OTHER PUBLICATIONS

"Office Action of Taiwan Counterpart Application", issued on May 18, 2023, p. 1-p. 10.

*Primary Examiner* — Oyesola C Ojo
(74) *Attorney, Agent, or Firm* — JCIPRNET

(57) ABSTRACT

The disclosure provides an electronic device including a substrate, a first vibrating unit, and a supporting unit. The substrate has a first surface. The first vibrating unit is disposed on the first surface and has a second surface. The second surface faces the first surface. The supporting unit is disposed between the substrate and the first vibrating unit. The first surface and the second surface are separated by a distance through the supporting unit. This distance ranges from equal to or greater than 0.06 mm to equal to or less than 65.4 mm.

13 Claims, 9 Drawing Sheets

(56) References Cited

U.S. PATENT DOCUMENTS

| | | | | |
|---|---|---|---|---|
| 2011/0266640 | A1* | 11/2011 | Kasai | H04R 19/04 257/416 |
| 2015/0078604 | A1* | 3/2015 | Seo | G06F 3/0202 381/333 |
| 2017/0263848 | A1* | 9/2017 | Kim | H10N 30/852 |
| 2018/0004292 | A1* | 1/2018 | Kuo | G06F 1/1652 |
| 2018/0009003 | A1* | 1/2018 | Kim | H10N 30/883 |
| 2018/0343512 | A1* | 11/2018 | Choi | H04R 1/028 |
| 2019/0077149 | A1* | 3/2019 | Nakayama | B41J 2/14233 |
| 2020/0059733 | A1* | 2/2020 | Shin | H04R 17/00 |
| 2020/0314556 | A1* | 10/2020 | Lee | H10N 30/206 |
| 2021/0048842 | A1* | 2/2021 | Choi | G10K 9/125 |
| 2021/0314690 | A1* | 10/2021 | Hsiao | G06F 3/016 |
| 2023/0047856 | A1* | 2/2023 | Dehé | H04R 31/003 |

FOREIGN PATENT DOCUMENTS

| | | | | |
|---|---|---|---|---|
| KR | 20190070749 | | 6/2019 | |
| TW | 201700994 | A * | 1/2017 | G06K 9/0002 |
| TW | 202019190 | | 5/2020 | |

* cited by examiner

ELECTRONIC DEVICE

CROSS-REFERENCE TO RELATED APPLICATION

This application claims the priority benefit of China application serial no. 202210051284.1, filed on Jan. 17, 2022. The entirety of the above-mentioned patent application is hereby incorporated by reference herein and made a part of this specification.

BACKGROUND

Technical Field

The disclosure relates to an electronic device.

Description of Related Art

Images and sound have always been the important functions of various electronic devices. With the development of various types of electronic devices, technologies for integrating sound components into display panels have been successively proposed in the industry.

SUMMARY

The disclosure relates to an electronic device, which may have functions of both sound emission and image displaying.

According to an embodiment of the disclosure, an electronic device includes a substrate, a first vibrating unit, and a supporting unit. The substrate has a first surface. The first vibrating unit is disposed on the first surface and has a second surface. The second surface faces the first surface. The supporting unit is disposed between the substrate and the first vibrating unit. The first surface and the second surface are separated by a distance through the supporting unit. This distance ranges from equal to or greater than 0.06 mm to equal to or less than 65.4 mm.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF DISCLOSED EMBODIMENTS

Figure 1:
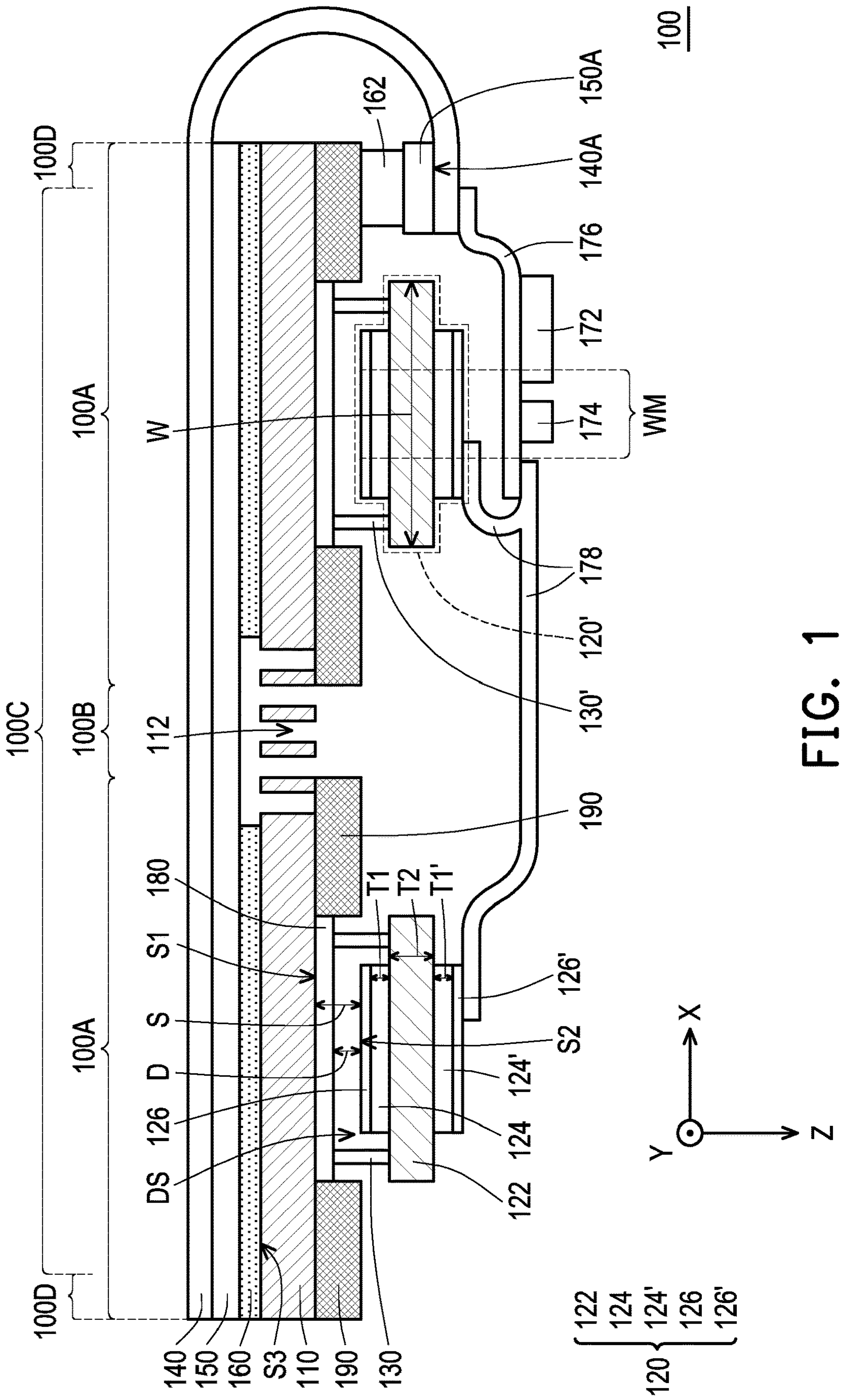
FIG. 1 is a schematic view of an electronic device according to an embodiment of the disclosure.

Reference will now be made in detail to the exemplary embodiments of the disclosure, and examples of the exemplary embodiments are illustrated in the accompanying drawings.

Whenever possible, the same reference numerals are used in the drawings and descriptions to indicate the same or similar parts.

The disclosure can be understood by referring to the following detailed description in combination with the accompanying drawings. It should be noted that in order to make it easy for the reader to understand and for the simplicity of the drawings, the multiple drawings in this disclosure only depict a part of the electronic device, and the specific components in the drawings are not drawn according to actual scale. In addition, the number and size of each component in the drawings are only for exemplary purpose, and are not intended to limit the scope of the disclosure.

Throughout the disclosure and the appended claims, certain words are used to refer to specific components. Those skilled in the art should understand that electronic device manufacturers may refer to the same components by different names. The disclosure does not intend to distinguish those components with the same function but different names. In the following description and claims, the terms "include", "contain", and "have" are open-ended terms, so they should be construed as "include but not limited to . . . ". Therefore, when the terms "include", "contain", and/or "have" are used in the description of this disclosure, they specify the existence of a corresponding feature, region, step, operation, and/or member, but do not exclude the existence of one or more corresponding features, regions, steps, operations, and/or members.

Direction terms mentioned in the disclosure, such as "up," "down," "front," "back," "left," and "right," merely refer to directions in the accompanying drawings. Therefore, the direction terms used is for illustration, not for limiting this disclosure. In the drawings, each drawing shows the general features of the method, structure, and/or material used in a specific embodiment. However, these drawings should not be construed as defining or limiting the scope or nature of the embodiments. For example, for the sake of clarity, the relative size, thickness, and position of each film layer, region, and/or structure may be reduced or enlarged.

When a corresponding member (such as a film layer or a region) is described as being "disposed or formed on another member," it may be directly disposed or formed on another member, or there may be other members therebetween. On the other hand, when a member is described as being "directly disposed or formed on another member," no member exists therebetween. In addition, when a member is described as being "disposed or formed on another member," the two have a vertical relationship in the top view direction, and this member may be located above or below the other member, and the vertical relationship depends on the device orientation.

It should be understood that when a member or a film layer is described as being "connected to" another member or film layer, it may be directly connected to the another member or film layer, or there may be an intervening member or film layer therebetween. When a member is described as being "directly connected to" another member or film layer, no intervening member or film layer exists therebetween. In addition, when a member is described as being "coupled to another member (or a variant thereof)," it may be directly connected to the another member, or be indirectly connected (such as being electrically connected) to the another member through one or more members.

The terms "approximately", "equal to", "equal" or "same", and "essentially" or "substantially" are generally construed as within 20% of a given value or range, or as within 10%, 5%, 3%, 2%, 1%, or 0.5% of the value or range.

Ordinal numbers in this specification and the claims such as "first" and "second" are used to modify a component, and do not imply or represent that the (or these) component (or components) has (or have) any ordinal number, and do not indicate any order between a component and another component, or an order in a manufacturing method. These ordinal numbers are merely used to clearly distinguish a component having a name with another component having the same name. Different terms may be used in the claims and the specification, so that a first member in the specification may be a second member in the claims.

It should be understood that the following embodiments may disassemble, replace, reorganize, and mix the features in several different embodiments to complete other embodiments without departing from the spirit of the disclosure. As long as the features of the embodiments do not violate the spirit of the disclosure or conflict each other, they may be mixed and matched as desired. An X axis, a Y axis, and a Z axis are shown in the accompanying drawings disclosed herein below to represent the orientations of respective components and devices. In some embodiments, the X axis, the Y axis, and the Z axis are perpendicular to one another, but the disclosure is not limited thereto. In some other embodiments, the X axis, the Y axis, and the Z axis may be three axes intersecting two by two, but not necessarily perpendicular to one another. In addition, terms such as first, second, and third described herein below are merely for the convenience of distinguishing multiple identical or similar members, features, and/or structures, and do not limit the manufacturing sequence, stacking sequence, etc. of the members, features, and/or structures.

FIG. 1 is a schematic view of an electronic device according to an embodiment of the disclosure. As shown in FIG. 1, an electronic device 100 at least includes a substrate 110, a first vibrating unit 120, and a supporting unit 130. The substrate 110 has a first surface S1. The first vibrating unit 120 is disposed on the first surface S1 and has a second surface S2. The second surface S2 faces the first surface S1. The supporting unit 130 is disposed between the substrate 110 and the first vibrating unit 120. The substrate 110 and the first vibrating unit 120 are separated by a distance D through the supporting unit 130, so as to form a separation space DS between the second surface S2 and the first surface S1. The distance D ranges from equal to or greater than 0.06 mm to equal to or less than 65.4 mm. In some embodiments, the first surface S1 and the second surface S2 may be separated from each other by a spacing S, and the spacing S may be greater than or equal to the distance D. In some embodiments, the separation space DS is the space that exists between the first surface S1 and the second surface S2. In some embodiments, it is possible that there is one or more film layers/members, etc. between the first surface S1 and the second surface S2, such that the spacing S is greater than the distance D. Here, the distance D may be a minimum distance in which the separation space DS between the first surface S1 and the second surface S2 is measured in a Z-axis direction. In some embodiments, a measuring point for measuring the distance D may be located in a central portion of the first vibrating unit 120. For example, a method of selecting the measuring point is to divide an overall width W of the first vibrating unit 120 into three equal parts, and then select a central section WM from the three equal parts. The measuring point may be any point located in the central section WM. That is to say, the distance D may be understood as a minimum interval between the second surface S2 of the first vibrating unit 120 from any point in the central section WM to the first surface S1.

In this embodiment, the substrate 110 is a plate-like material with sufficient mechanical properties, which may be used to support individual members disposed thereon and maintain an appearance of the electronic device 100. For example, a material of the substrate 110 may include stainless steel or similar materials. In some embodiments, the electronic device 100 may be a bendable device, and has multiple flat regions 100A and a bending region 100B between the adjacent flat regions 100A. The substrate 110 has multiple recesses 112 located in the bending region 100B. The configuration of the recesses 112 allows the substrate 110 to be bent in the bending region 100B, so as to realize the bendable function. In some embodiments, the electronic device 100 may be a flexible device, such as a flexible display, which may be bent or flattened according to user requirements during use, or a curved device, such as a curved display, which is bent into a curved state and fixed in the curved state. In terms of the flexible device, the electronic device 110 may be, for example, a roll-up device, which may be rolled up or flattened like a reel. In addition, the electronic device 110 may be bent, so that the two adjacent flat regions 100A are pivoted facing each other. FIG. 1 illustrates a state where the electronic device 100 is flattened, but in some embodiments or in some usage states, the electronic device 110 may be bent at the bending region 100B to present a non-planar state. However, the disclosure is not limited thereto. In some embodiments, the electronic device 110 may be a planar device without being bendable.

The first vibrating unit 120 is disposed on the first surface S1 of the substrate 110, and is specifically located in the flat area 100A of the electronic device 100. The first vibrating unit 120 is adapted to generate a sound wave to provide the function of sound emission. The first vibrating unit 120 includes at least a conductive layer 122 and an oscillation layer 124, and the conductive layer 122 and the oscillation layer 124 overlap in the Z-axis direction. In some embodiments, the oscillation layer 124 may be disposed on a surface of the conductive layer 122 by sintering, bonding, or the like. The oscillation layer 124 is, for example, a component that may convert electrical energy and mechanical energy into each other. The conductive layer 122 may be used to provide the electrical energy to induce the mechanical operation, such as vibration, of the oscillation layer 124. In addition, the first vibrating unit 120 further includes an electrode layer 126, and the oscillation layer 124 is disposed between the conductive layer 122 and the electrode layer 126.

In some embodiments, as shown in FIG. 1, the first vibrating unit 120 is a double-sided vibrating unit, which further includes another oscillation layer 124' and another electrode layer 126'. The oscillation layer 124 and the oscillation layer 124' are disposed on two opposite sides of the conductive layer 122. The electrode layer 126' and the electrode layer 126 are disposed on the two opposite sides of the conductive layer 122. An electric field between the electrode layer 126' and the conductive layer 122 may drive the oscillation layer 124' to mechanically vibrate. The first vibrating unit 120 may generate the sound wave under the mechanical vibration of the oscillation layer 124 and the oscillation layer 124'. In some embodiments, a frequency of the sound wave generated by the first vibrating unit 120 may fall within a range audible to human ears, e.g., from about 20 hertz (Hz) to 20,000 hertz (Hz). In some embodiments, the oscillation layer 124' and the electrode layer 126' may be omitted, or the oscillation layer 124 and the electrode layer 126 may be omitted, so as to realize a single-sided vibrating unit. The vibrating units in other accompanying drawings herein may be double-sided or single-sided vibrating units, and are not limited to the embodiments disclosed in the accompanying drawings.

In some embodiments, the conductive layer 122 is, for example, a metal material. In some embodiments, the conductive layer 122 includes copper, iron, brass, and steel, etc. The conductive layer 122 may have sufficient mechanical strength to support the oscillation layer 124 and the oscillation layer 124', and may allow the mechanical vibration to occur in the oscillation layer 124 and the oscillation layer 124'. The oscillation layer 124 has a thickness T1, and the conductive layer 122 has a thickness T2. If a ratio of the thickness T1 to the thickness T2 is too small, the vibration of the first vibrating unit 120 may be hindered, and if the ratio of the thickness T1 to the thickness T2 is too large, an issue of insufficient mechanical support of the conductive layer 122 may occur. Therefore, in some embodiments, the ratio of the thickness T1 of the oscillation layer 124 to the thickness T2 of the conductive layer 122 ranges from equal to or greater than 0.5 to equal to or less than 1, that is, $0.5 \leq T1/T2 \leq 1$. Similarly, the ratio of a thickness T1' of the oscillation layer 124' to the thickness T2 of the conductive layer 122 ranges from equal to or greater than 0.5 to equal to or less than 1, that is, $0.5 \leq T1'/T2 \leq 1$.

The oscillation layer 124 and the oscillation layer 124' may include piezoelectric materials. The piezoelectric materials are substantially classified into types such as single crystals, ceramics, thin films, and polymers. The single crystal piezoelectric materials include crystals such as crystal and lithium niobate. The ceramic piezoelectric materials include a compound of barium titanate ($BaTiO3$), lead titanate ($PbTiO3$), and lead zirconate titanate ($Pb(ZrTi)O3$, PZT). The thin-film piezoelectric materials include thin films such as zinc oxide, lead zirconate titanate, and aluminum oxide. The polymer piezoelectric materials include polyvinylidene fluoride (PVDF) and a copolymer thereof, polyvinyl fluoride, polyvinyl chloride, poly-γ-methyl-L-glutamate, and nylon-11, etc. The electrode layer 126 and the electrode layer 126' are, for example, thin-film electrodes, such as metal thin films and transparent conductive thin films, etc.

The supporting unit 130 is disposed between the first vibrating unit 120 and the substrate 110. The supporting unit 130 substantially surrounds a periphery of the first vibrating unit 120. In some embodiments, the supporting unit 130 may be surrounded in a ring shape, and is not limited to be a closed ring shape. The conductive layer 122 of the first vibrating unit 120 may extend beyond the oscillation layer 124 and the oscillation layer 124' in width, and the supporting unit 130 may be connected to a portion of the conductive layer 122 extending beyond the oscillation layer 124 and the oscillation layer 124' in width. The supporting unit 130 separates the first vibrating unit 120 from the substrate 110 to form the separation space DS. For example, the distance D of the separation space DS between the first surface S1 of the substrate 110 and the second surface S2 of the first vibrating unit 120 ranges from equal to or greater than 0.06 mm to equal to or less than 65.4 mm. In some embodiments, the distance D ranges from equal to or greater than 0.1 mm to equal to or less than 32.7 mm. In this way, the separation space DS may allow the first vibrating unit 120 to mechanically vibrate and reduce physical collision between the first vibrating unit 120 and other components.

In this embodiment, the electronic device 100 further includes another first vibrating unit 120' and a supporting unit 130' corresponding to the first vibrating unit 120'. The supporting unit 130' is disposed on the first surface S1 of the substrate 110, and is located between the first vibrating unit 120' and the substrate 110. Specifically, structures, materials, and configurations of the first vibrating unit 120' and the supporting unit 130' are substantially the same as those of the first vibrating unit 120 and the supporting unit 130. Therefore, the same details will not be repeated in the following. However, the first vibrating unit 120 and the first vibrating unit 120' are respectively disposed in the different flat regions 100A. For example, the first vibrating unit 120 and the first vibrating unit 120' are located on two opposite sides of the bending region 100B.

In some embodiments, in the first vibrating unit 120, characteristics of the oscillation layer 124 and the oscillation layer 124', such as resonance properties, are related to a wavelength of the emitted sound. Moreover, the distance D of the separation space DS may be determined according to the wavelength of the sound emitted correspondingly by the first vibrating unit 120, so as to optimize the sound emitted by the first vibrating unit 120. For example, when resonance frequencies of the oscillation layer 124 and the oscillation layer 124' are at relatively low frequencies, the distance D of the separation space DS may be designed to be greater, which may, for example, be designed to be ¼ of the wavelength of the sound wave corresponding to the resonance frequencies of the oscillation layer 124 and the oscillation layer 124'. In this way, the sound waves generated by the oscillation layer 124 and the oscillation layer 124' may establish a good waveform of a fundamental tone in the separation space DS, so as to emit the good sound. For example, in the embodiment in which the resonance frequencies of the oscillation layer 124 and the oscillation layer 124' are approximately 1.3 kHz, the wavelength of the generated sound wave is about 261.5 mm. At this time, the distance D of the separation space DS may be designed to be about 65.4 mm, but the disclosure is not limited thereto. In addition, as the resonance frequencies of the oscillation layer 124 and the oscillation layer 124' are greater, the distance D of the separation space DS may be designed to be smaller.

Since the distance D of the separation space DS affects a volume of the overall electronic device 100, a designer may select the suitable oscillation layers 124 and 124' according to the consideration of the volume. However, if the distance D is too small, the first vibrating unit 120 and the first vibrating unit 120' may collide with other components during a vibration process or even during the use and handling of the electronic device 100, resulting in damage. Therefore, in some embodiments, the distance D is greater than 0.06 mm or greater than 1 mm, so as to maintain a required safety distance. In addition, the substrate 110 has the recesses 112 between the first vibrating unit 120 and the first vibrating unit 120'. The recesses 112 may provide sound insulation to prevent the sound waves generated by the first vibrating unit 120 and the first vibrating unit 120' from interfering with each other.

In addition to the components that may vibrate to emit the sounds, the electronic device 100 further includes components used to display images. For example, the electronic device 100 further includes a display panel 140, a carrier layer 150 for carrying the display panel 140, and an adhesive layer 160 for attaching the display panel 140 to the substrate 110. According to the display function of the display panel 140, the electronic device 100 may have a display region 100C and non-display regions 100D. The distribution of the display region 100C and the non-display regions 100D and the distribution of the flat regions 100A and the bending region 100B depend on different properties, and are not limited to each other. For example, the display region 100C may extend in the flat regions 100A and the bending region 100B. Therefore, the electronic device 100 may display the images in both the flat regions 100A and the bending region 100B. In addition, the display region 100C may be bent in the bending region 100B.

The display panel 140 is disposed on a third surface S3 of the substrate 110, and may be attached to the third surface S3 of the substrate 110 through, for example, the adhesive layer 160 and the carrier layer 150, so as to provide a display image on a side of the third surface S3. The third surface S3 and the first surface S1 are two opposite surfaces of the substrate 110. The carrier layer 150 is used to carry the display panel 140, but may be omitted in some embodiments as appropriate. The display panel 140 includes a self-emitting display unit, such as an organic light emitting display panel, a micro light emitting diode display panel, and a mini light emitting diode display panel, etc. The display panel 140 may be a flexible display panel. For example, the display panel 140 may be bent from the third surface S3 of the substrate 110 to the first surface S1 of the substrate 110. Meanwhile, a portion 140A of the display panel 140 may be attached to the first surface S1 of the substrate 110 through another adhesive layer 162. In addition, this portion 140A of the display panel 140 may be carried by a portion 150A of the carrier layer 150. Therefore, the portion 150A of the carrier layer 150 is located between the adhesive layer 162 and the portion 140A of the display panel 140.

The electronic device 100 further includes a first driving unit 172, a second driving unit 174, a circuit board 176, and a conductive connecting member 178. The display panel 140 is electrically connected to the first driving unit 172, and the first driving unit 172 is used to provide an electrical signal to the display panel 140, so as to control the display panel 140 to display the images. The second driving unit 174 is electrically connected to the first vibrating unit 120 and the first vibrating unit 120' to control the mechanical vibration of the first vibrating unit 120 and the first vibrating unit 120'. The first driving unit 172 and the second driving unit 174 are, for example, integrated circuit (IC) components, respectively. The first driving unit 172 and the second driving unit 174 may be disposed on the circuit board 176. The circuit board 176 may be connected to the portion 140A of the display panel 140 attached to the first surface S1, so as to realize electrical signal communication and transmission between the display panel 140 and the first driving unit 172 through the circuit board 176. The conductive connecting member 178 may include a flat cable, a Dupont wire, and a circuit board, etc. The conductive connecting member 178 is connected between the circuit board 176 and the first vibrating unit 120 and between the circuit board 176 and the first vibrating unit 120'. The conductive connecting member 178 may transmit the electrical signal provided by the second driving unit 174 to (for example) the first vibrating unit 120 and the first vibrating unit 120'. Specifically, the conductive connecting member 178 may be connected to the first vibrating unit 120, and the conductive layer 122 and the electrode layers 126 and 126' of the first vibrating unit 120'. In some embodiments, the second driving unit 174 and the first driving unit 172 may be integrated into the same integrated circuit component, and are not required to be independently disposed. In other words, in some embodiments, in addition to being electrically connected to the display panel 140, the first driving unit 172 may also be electrically connected to the first vibrating unit 120 and the first vibrating unit 120'.

The electronic device 100 further includes a heat conducting unit 180 disposed between the substrate 110 and the supporting unit 130. The heat conducting unit 180 overlaps the first vibrating unit 120. The heat conducting unit 180 may be in contact with the substrate 110 and be disposed on the first surface S1 of the substrate 110. The heat conducting unit 180 may be used to provide functions such as heat transfer and dispersion at a position where the first vibrating unit 120 is disposed. In some embodiments, the heat conducting unit 180 includes metal, metal oxide, boron nitride, or a ceramic material. In some embodiments, the heat conducting unit 180 has both adhesiveness and heat conductivity. Therefore, the heat conducting unit 180 may be used to bond the supporting unit 130 to the substrate 110. In some embodiments, a material of the heat conducting unit 180 includes a colloidal material and a heat conductive material. The colloidal material may include epoxy resin, polyurethane resin, polymethyl methacrylate resin, or cyanoacrylate resin. The heat conductive material includes metal, metal oxide, silicon dioxide, or a ceramic microsphere (e.g., boron nitride). In some embodiments, the heat conducting unit 180 may be in the form of paste or double-sided adhesive.

In some embodiments, the heat conducting unit 180 is compact, and does not excessively absorb vibration waves of the first vibrating unit 120 and the first vibrating unit 120', thereby helping to transmit the sound wave emitted by the first vibrating unit 120 to maintain the function of sound emission of electronic device 100. In some embodiments, the heat conducting unit 180 may have an opening, and the opening may overlap the oscillation layer 124 of the first vibrating unit 120 in the Z-axis direction. In this way, the separation space DS may be formed between the first surface S1 and the second surface S2. That is to say, the spacing S between the first surface S1 and the second surface S2 may be equal to the distance D of the separation space DS.

The electronic device 100 further includes a heat dissipation layer 190. The heat dissipation layer 190 is disposed on the first surface Si of the substrate 110, and is substantially located in a region other than the first vibrating unit 120 and the first vibrating unit 120'. In some embodiments, the heat dissipation layer 190 may not overlap the first vibrating unit 120 and the first vibrating unit 120'. The heat dissipation layer 190 includes composite materials, such as graphite, other porous materials, and metal foils (such as copper foils). The heat dissipation layer 190 may be used to dissipate heat generated by the display panel 140 to prevent the electronic device 100 from being overheated and affecting normal performance. The heat dissipation layer 190 may be omitted in the bending region 100B to ensure the bendable property of the bending region 100B, but the disclosure is not limited thereto. In some embodiments, the heat dissipation layer 190 may be disposed in the bending region 100B, and the heat dissipation layer 190 may have multiple through holes in the bending region 100B to allow the electronic device 100 to be bent.

This embodiment only exemplarily illustrates that the electronic device 100 includes the two vibrating units to realize the function of sound emission, but the disclosure is not limited thereto. In other embodiments, the electronic device 100 may include more vibrating units or only a single vibrating unit to realize the function of sound emission. In addition, in some embodiments, the first vibrating unit 120 in this embodiment may be disposed in the same electronic device together with other sound components. That is to say, the electronic device may include more than two types of sound components, one of which may have a structural design of the first vibrating unit 120.

Figure 2:
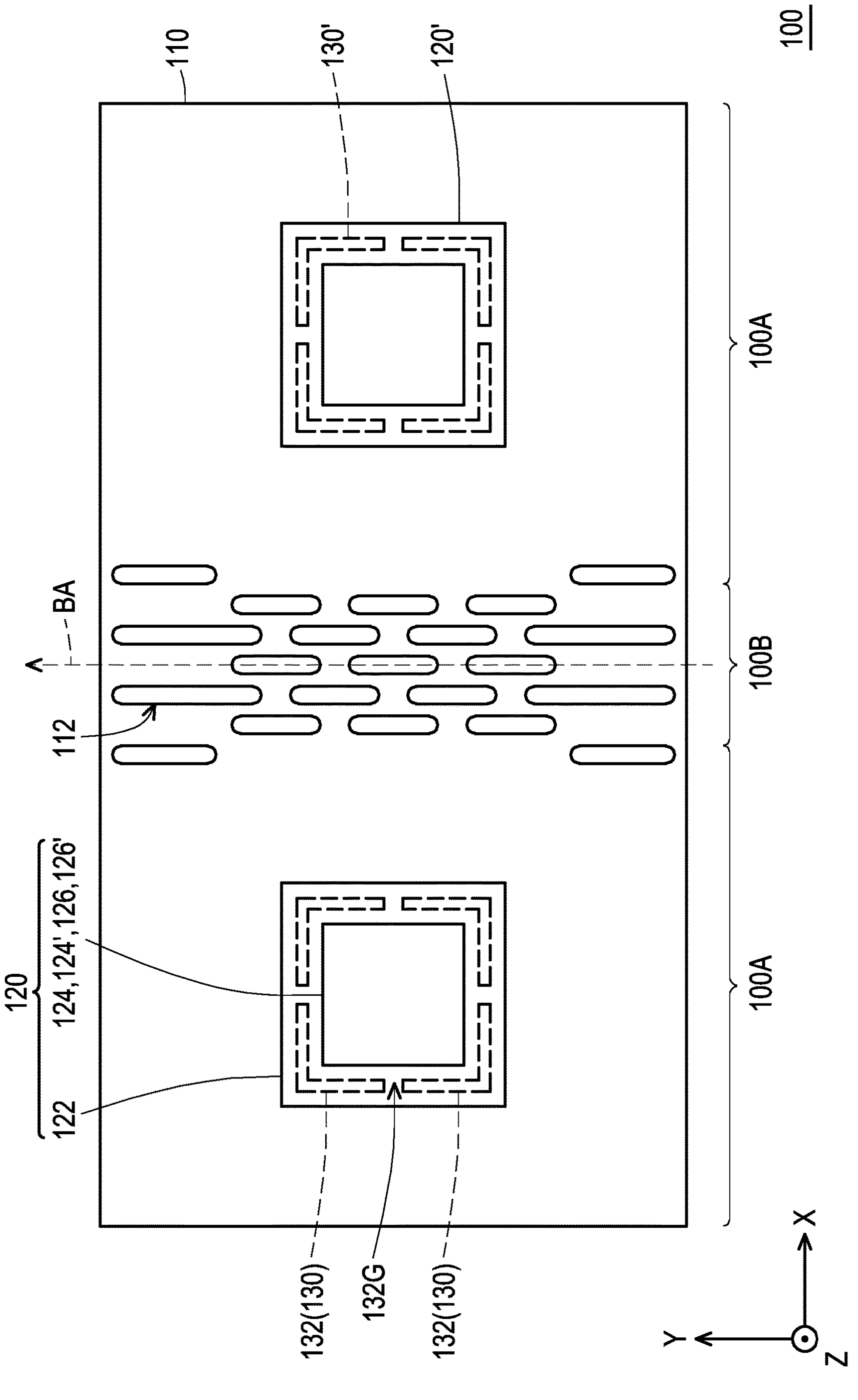
FIG. 2 is a schematic partial top view of an electronic device according to an embodiment of the disclosure.

FIG. 2 is a schematic partial top view of an electronic device according to an embodiment of the disclosure. FIG. 2 may be understood as the embodiment of the electronic device 100 in FIG. 1 viewed along the Z direction, but the disclosure is not limited thereto. The same reference numerals in FIG. 2 and FIG. 1 denote the same or similar components, so that cross-reference may be made between configurations, characteristics, materials, and other features of the individual components. For convenience of description, FIG. 2 only shows the substrate 110, the first vibrating unit 120, the first vibrating unit 120', and the corresponding supporting units 130 and 130' of the electronic device 100, and the first vibrating unit 120, the first vibrating unit 120', and the corresponding supporting units 130 and 130' are shown in a perspective manner. In fact, in the top view, the supporting units 130 and 130' are shielded by the first vibrating units 120 and 120', but in order to show the supporting units 130 and 130', outlines of the supporting units 130 and 130' are shown in dashed lines in FIG. 2. A stacking relationship between the first vibrating units 120 and 120', the supporting units 130 and 130', and the substrate 110 may be referred to FIG. 1 and the description thereof.

It may be seen from FIG. 2 that the supporting unit 130 is disposed along the periphery of the first vibrating unit 120 to form the ring shape. Specifically, the supporting unit 130 may include multiple supporting members 132. The supporting members 132 surround the first vibrating unit 120 in the top view (FIG. 2) of the electronic device 100, and two of the adjacent supporting members 132 are separated by a gap 132G. In this embodiment, the sound wave generated by the first vibrating unit 120 may be transmitted out through the gaps 132G between the supporting members 132 and used as a sound leakage channel. In FIG. 2, the first vibrating unit 120 has a square shape, and the gaps 132G are disposed on four sides of the square. However, this is merely for illustrative purposes, and is not intended to limit the disclosure. The first vibrating unit 120 may have other geometric shapes or specially designed shapes, and the gap 132G may be disposed at any position of the supporting unit 130, for example, at a corner.

In addition, FIG. 2 schematically shows the recesses 112 disposed on the substrate 110. The recesses 112 may extend in a Y-axis direction to have an elongated shape. The recesses 112 may be arranged in multiple rows, and the adjacent rows of the recesses 112 may be disposed in a staggered way. With the configuration of the recesses 112, a bending axis BA of the electronic device 100 may be substantially parallel to the Y direction. For example, the bending region 100B is the region that may be bent, and at least a part of the recesses 112 may be located in the bending region 110B. The flat regions 100A are the regions that are still flat under a bending state. The flat regions 100A may be pivoted about the bending axis BA from being oriented parallel to each other to facing (or facing away) each other. In addition to allowing the electronic device 100 to be bent, the recesses 112 on the substrate 110 may also have the function of sound insulation, which may prevent the sound waves generated by the first vibrating unit 120 and the first vibrating unit 120' from interfering with each other. In this way, the electronic device 100 is provided with the vibrating units for sound emission, but a hole structure for sound insulation is disposed between the adjacent vibrating units to reduce the interference of the sound waves between the adjacent vibrating units.

Figure 3:
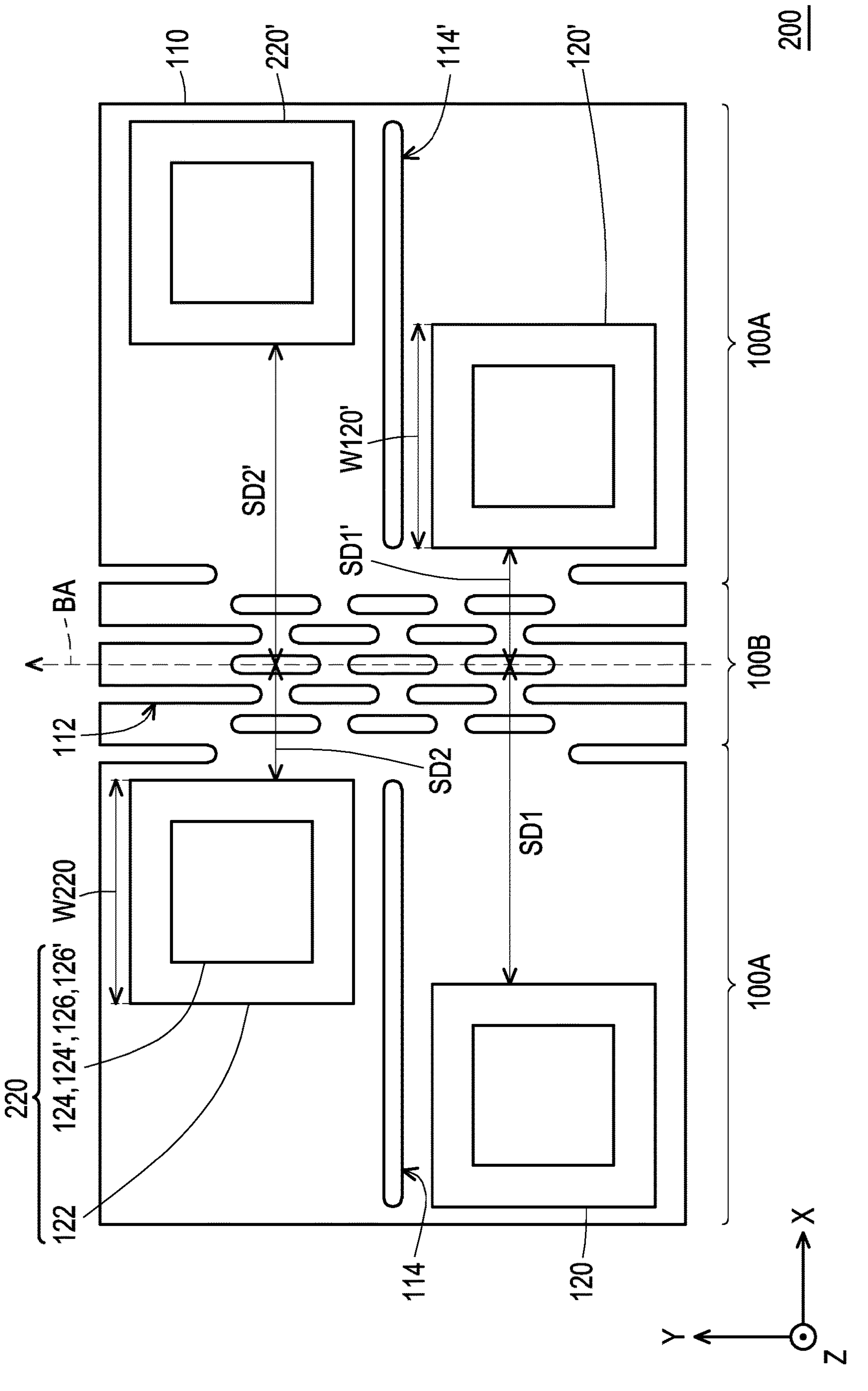
FIG. 3 is a schematic partial top view of an electronic device according to an embodiment of the disclosure.

FIG. 3 is a schematic partial top view of an electronic device according to an embodiment of the disclosure. FIG. 3 may be understood as the embodiment of the electronic device 100 in FIG. 1 viewed along the Z direction, but the disclosure is not limited thereto. Components with the same functions in FIG. 3 and FIG. 1 will be denoted by the same reference numerals, so that cross-reference may be made between the two. For convenience of description, FIG. 3 only shows the substrate 110, the first vibrating unit 120, and the first vibrating unit 120' of the electronic device 100, and FIG. 3 further shows another second vibrating unit 220 and second vibrating unit 220'. This embodiment is described by taking an electronic device 200 including the four vibrating units having the same structure as an example, but the disclosure is not limited thereto. In other words, the structures of the second vibrating unit 220 and the second vibrating unit 220' may be referred to the descriptions of the first vibrating unit 120 and the first vibrating unit 120' in FIG. 1. For example, referring to FIG. 1, the second vibrating unit 220 and the second vibrating unit 220' are both disposed on the first surface S1 of the substrate 110 and include the conductive layer 122, the oscillation layer 124, and the electrode layer 126 in the same way as the first vibrating unit 120. In some embodiments, the second vibrating unit 220 and the second vibrating unit 220' may be double-sided vibrating units or single-sided vibrating units.

The electronic device 200 may be a bendable device, and has the flat regions 100A and the bending region 100B between the adjacent flat regions 100A. In the electronic device 200, the substrate 110 may have the recesses 112, and each of the recesses 112 has an outer shape with a dimension on the Y axis greater than that on the X axis. The recesses 112 may be arranged in multiple rows, and the adjacent rows of the recesses 112 may be disposed in a staggered way. The bending region 100B may be a region between the outermost recesses 112 in an X-axis direction. The configuration of the recesses 112 allows the electronic device 200 to be bent in the bending region 100B, and the bending axis BA of the electronic device 200 may be substantially parallel to the Y direction. The flat regions 100A at two sides of the bending region 100B may approach each other under the pivoting of the electronic device 200 along the bending axis BA.

The first vibrating unit 120, the first vibrating unit 120', the second vibrating unit 220, and the second vibrating unit 220' are all disposed on the substrate 110. The first vibrating unit 120 and the first vibrating unit 120' are located at the two sides of the bending region 100B, and the second vibrating unit 220 and the second vibrating unit 220' are also located at the two sides of the bending region 100B. In some embodiments, the first vibrating unit 120 and the first vibrating unit 120' may be arranged along the X-axis direction, and a separation distance SD1 between the first vibrating unit 120 and the bending axis BA may be different from a separation distance SD1' between the first vibrating unit 120' and the bending axis BA. When the electronic device 200 is pivoted along the bending axis BA such that the flat regions 100A at the two sides of the bending region 100B approach each other, the first vibrating unit 120 and the first vibrating unit 120' do not overlap each other to limit the bending of the electronic device 200. Similarly, a relative configuration relationship between the second vibrating unit 220 and the second vibrating unit 220' is also similar to that of the first vibrating unit 120 and the first vibrating unit 120'. A separation distance SD2 between the second vibrating unit 220 and the bending axis BA may be different from a separation distance SD2' between the second vibrating unit 220' and the bending axis BA. In some embodiments, the separation distance SD1 may be greater than the separation distance SD1', and even the separation distance SD1 may be greater than a sum of the separation distance SD1' and a width W120' of the first vibrating unit 120'. In addition, the separation distance SD2' may be greater than the separation distance SD2, and even the separation distance SD2' may be greater than a sum of the separation distance SD2 and a width W220 of the second vibrating unit 220. However, the above distance relationship is merely an exemplary description, and is not intended to limit the disclosure.

In this embodiment, the substrate 110 further has a recess 114. The recess 114 is located between the first vibrating unit 120 and the second vibrating unit 220 in a top view of the electronic device 200. The recess 114 may be used to isolate the sound waves generated by the first vibrating unit 120 and the second vibrating unit 220 to prevent the sound waves generated by the first vibrating unit 120 and the second vibrating unit 220 from interfering with each other. The recess 114 may extend through the substrate 110 or only extend to a partial thickness of the substrate 110 in the Z-axis direction. For example, the substrate 110 may have the thinner thickness at the recess 114 than elsewhere in the flat regions 100A. An extension length of the recess 114 in the X-axis direction is sufficient to overlap the first vibrating unit 120 and the second vibrating unit 220. However, in some embodiments, the recess 114 is not limited to extend along the X-axis direction. Similarly, the substrate 110 also has another recess 114' between the first vibrating unit 120' and the second vibrating unit 220' to provide sound insulation. A configuration relationship of the recess 114' relative to the first vibrating unit 120' and the second vibrating unit 220' and a structure of the recess 114' may be referred to the recess 114.

In addition, the recesses 112 on the substrate 110 may also have the function of sound insulation in addition to allowing the electronic device 200 to be bent, which may prevent the sound waves generated by the first vibrating unit 120 and the first vibrating unit 120' from interfering with each other and prevent the sound waves generated by the second vibrating unit 220 and the second vibrating unit 220' from interfering with each other. In this way, the electronic device 200 is provided with the vibrating units for sound emission, but a hole structure for sound insulation is disposed between the adjacent vibrating units to reduce the interference of the sound waves between the adjacent vibrating units.

Figure 4:
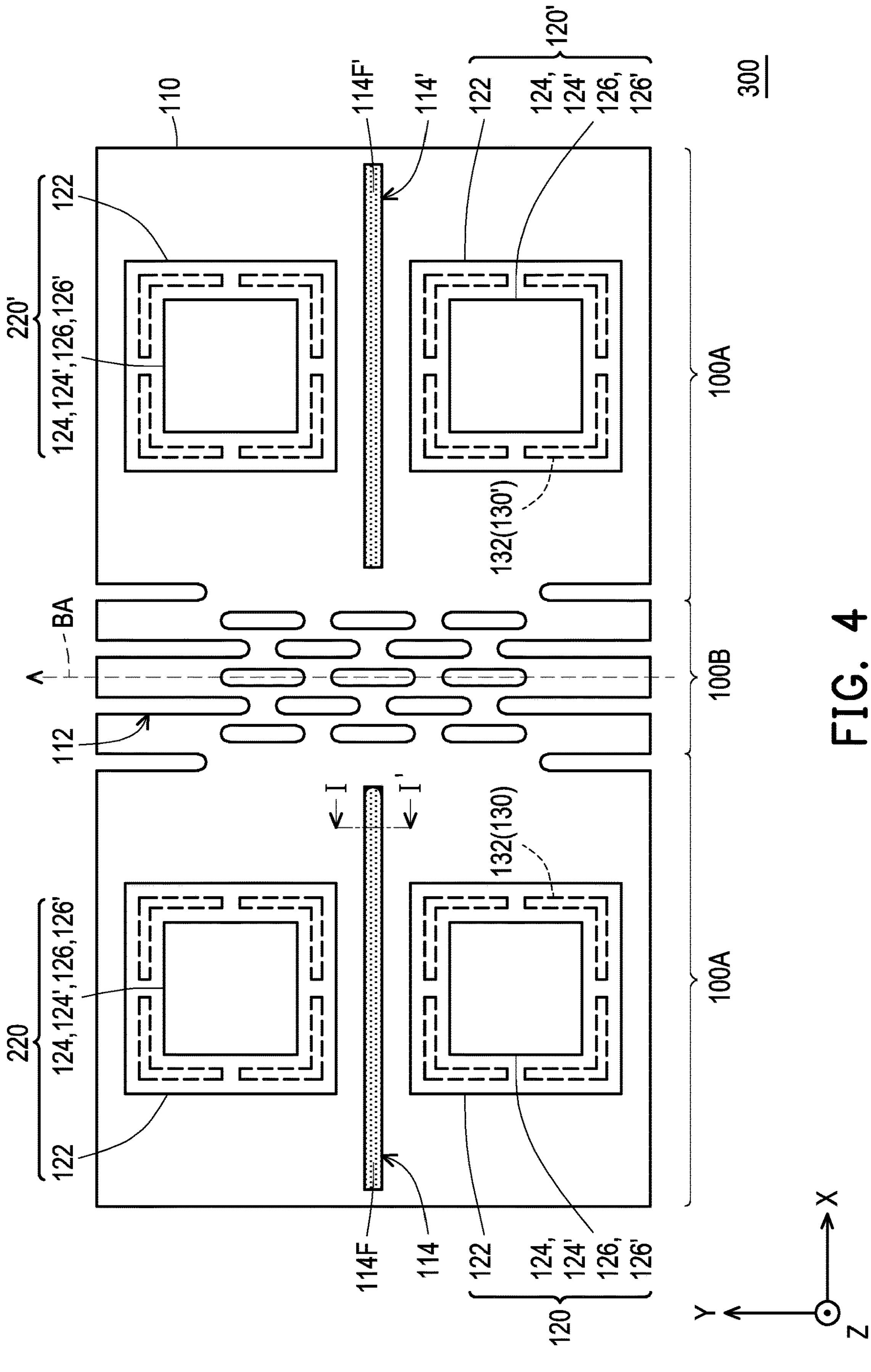
FIG. 4 is a schematic partial top view of an electronic device according to an embodiment of the disclosure.

FIG. 4 is a schematic partial top view of an electronic device according to an embodiment of the disclosure. An electronic device 300 in FIG. 4 is substantially similar to the electronic device 200. Therefore, the same reference numerals in the two embodiments are used to denote the same or interchangeable components. FIG. 4 shows the substrate 110, the first vibrating units 120 and 120', and the second vibrating units 220 and 220' of the electronic device 300. Disposing positions of the first vibrating units 120 and 120', and the second vibrating units 220 and 220' are slightly different from the description in FIG. 3, but the specific structures and functions of the first vibrating units 120 and 120', and the second vibrating units 220 and 220' may be referred to the descriptions of the foregoing embodiments. Specifically, the first vibrating unit 120 and the first vibrating unit 120' are, for example, disposed symmetrically with respect to the bending axis BA, and the second vibrating unit 220 and the second vibrating unit 220' are, for example, disposed symmetrically with respect to the bending axis BA. In addition, the electronic device 300 further includes vibration absorbing units 114F and 114F' filled in the recesses 114 and 114' of the substrate 110. The vibration absorbing unit 114F is filled in the recess 114, and the vibration absorbing unit 114F' is filled in the recess 114'.

Figure 5A:
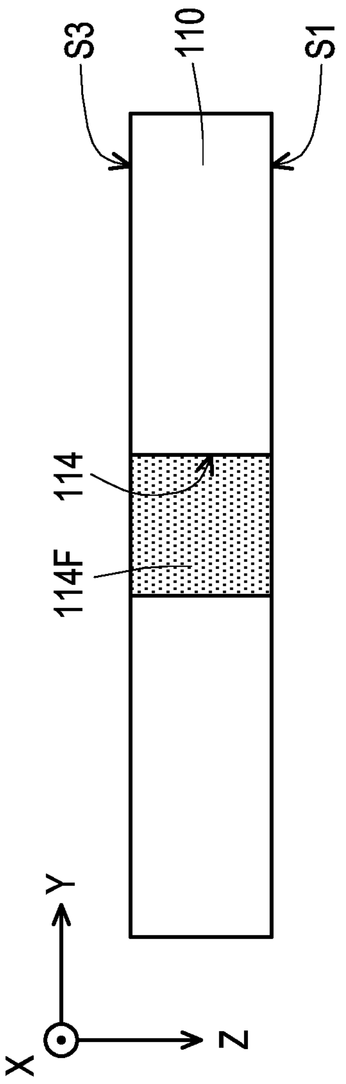
FIG. 5A and FIG. 5B are schematic views of cross-sections of a substrate 110 taken along a line I-I' in FIG. 4 according to different embodiments.
Figure 5B:
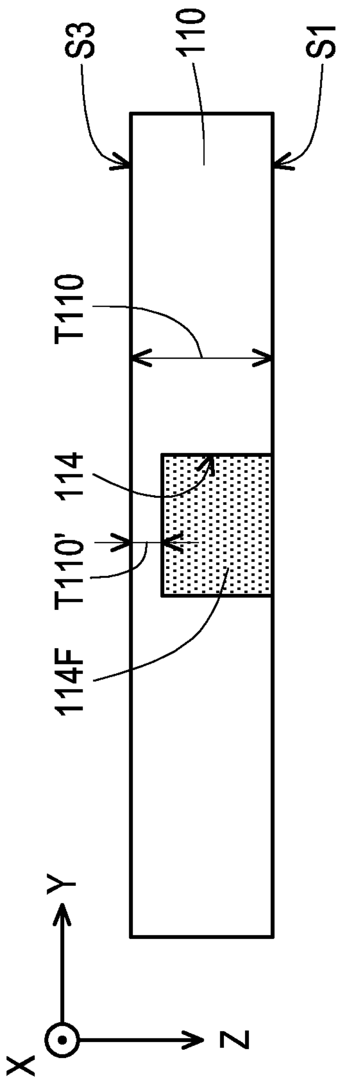

Materials of the vibration absorbing units 114F and 114F' include a vibration absorbing material. In some embodiments, the vibration absorbing material includes nitrile rubber, butyl rubber, polyurethane elastomers, polyethylene oxide-styrene block copolymers, plasticized polyvinyl chloride, polyvinyl butyral, polymethyl methacrylate, vinyl chloride-ethylene vinyl acetate copolymers, polyvinyl chloride blends, semi-interpenetrating network tertiary ethylene propylene diene monomer (EPDM) rubber and ethylene propylene monomer (EPM) rubber, interpenetrating network poly isobutyl ether and polymethyl acrylate, etc. FIG. 5A and FIG. 5B are schematic views of cross-sections of the substrate 110 taken along a line I-I' in FIG. 4 according to different embodiments. In FIG. 5A, the recess 114 may penetrate through the substrate 110 along a thickness direction, e.g., the Z-axis direction, of the substrate 110, and the vibration absorbing unit 114F is filled in the recess 114. That is to say, the recess 114 may continuously extend from the first surface S1 of the substrate 110 to the third surface S3 of the substrate 110. In some embodiments, two ends of the vibration absorbing unit 114F in the Z-axis direction may be flush with the third surface S3 and the first surface S1 of the substrate 110, respectively, but the disclosure is not limited thereto. In FIG. 5B, the recess 114 extend to a certain depth along the thickness direction of the substrate 110, but do not penetrate through the substrate 110. The recess 114 may extend from the first surface S1 toward the third surface S3, but do not reach the third surface S3. In this way, the substrate 110 has a thickness T110' at the recess 114 and a thickness T110 elsewhere, and the thickness T110' is less than the thickness T110. The vibration absorbing unit 114F is filled in the recess 114. In some embodiments, the vibration absorbing unit 114F may be flush with the first surface S1, but the disclosure is not limited thereto. An aspect of an extension depth of the recess 114 in FIG. 5A and FIG. 5B may be applied to the embodiment of FIG. 3.

Figure 6:
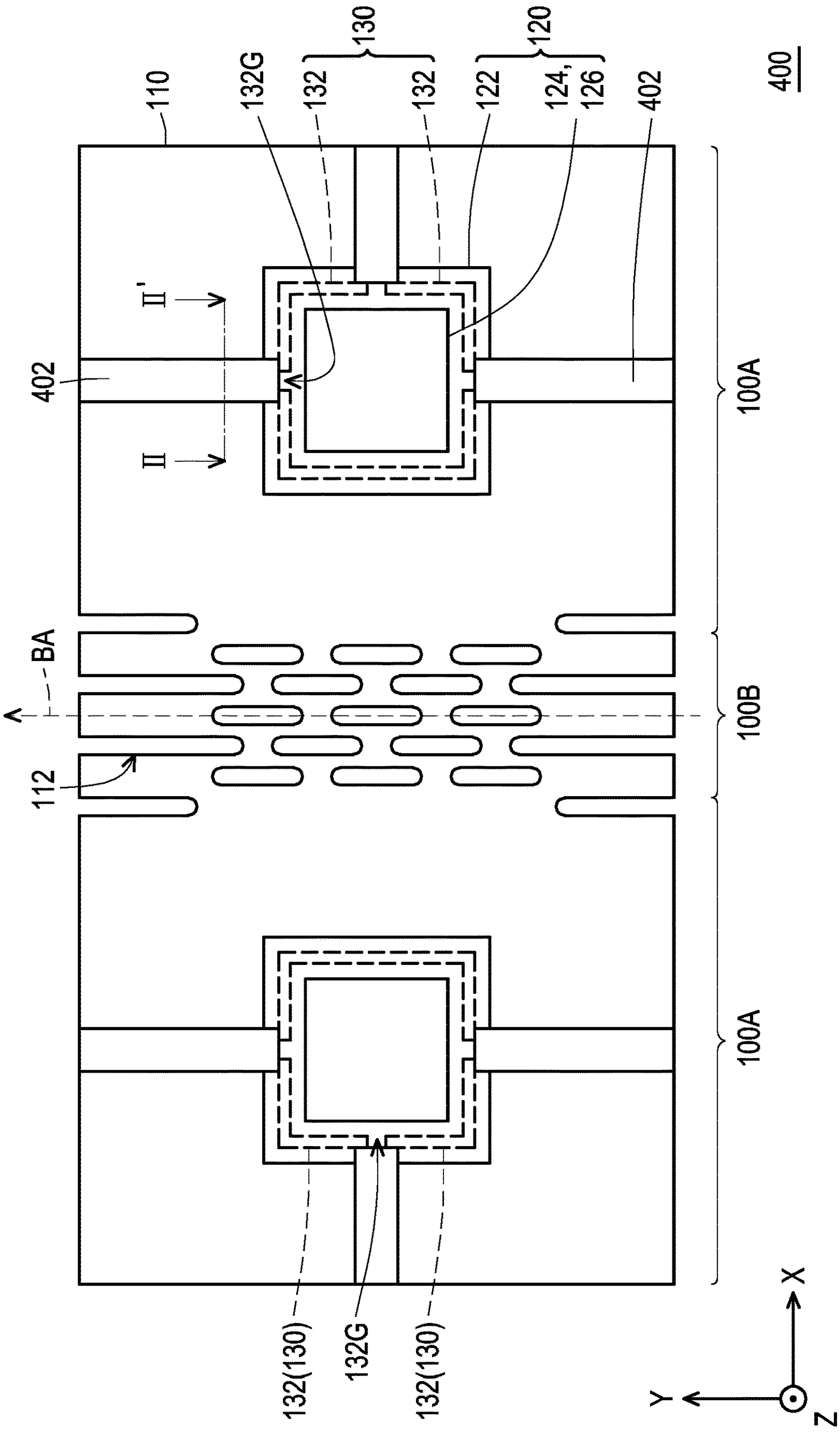
FIG. 6 is a schematic view of an electronic device according to an embodiment of the disclosure.

FIG. 6 is a schematic view of an electronic device according to an embodiment of the disclosure. An electronic device 400 in FIG. 6 is substantially similar to the electronic device 100 in FIG. 2. A difference from FIG. 2 is that the electronic device 400 in FIG. 6 includes the substrate 110, the first vibrating unit 120, the supporting unit 130, and a sound wave guiding unit 402. The configuration relationships, structures, functions, and materials, etc. of the substrate 110, the first vibrating unit 120, and the supporting unit 130 may be referred to the descriptions of FIG. 1 and FIG. 2. Therefore, the same details will not be repeated in the following. In this embodiment, the supporting unit 130 includes the supporting members 132. The supporting members 132 surround the first vibrating unit 120 in a top view (FIG. 6) of the electronic device 400, and two of the adjacent supporting members 132 are separated by the gap 132G. In addition, the sound wave guiding unit 402 is disposed corresponding to the gap 132G. The sound wave guiding unit 402 may extend away from the first vibrating unit 120 from the corresponding gap 132G. In other words, when a component corresponds to another component, it means that the component overlaps the another component in a direction. For example, the sound wave guiding unit 402 traversed by a line II-II' in FIG. 6 overlaps the corresponding gap 132G in the Y-axis direction. The sound wave guiding unit 402 may provide the function of sound wave guiding to guide the sound wave emitted by the first vibrating unit 120 to a terminal of the sound wave guiding unit 402 to be emitted to an outside world. In some embodiments, the sound wave guiding unit 402 may extend to an edge of the substrate 110, but the disclosure is not limited thereto.

Figure 7:
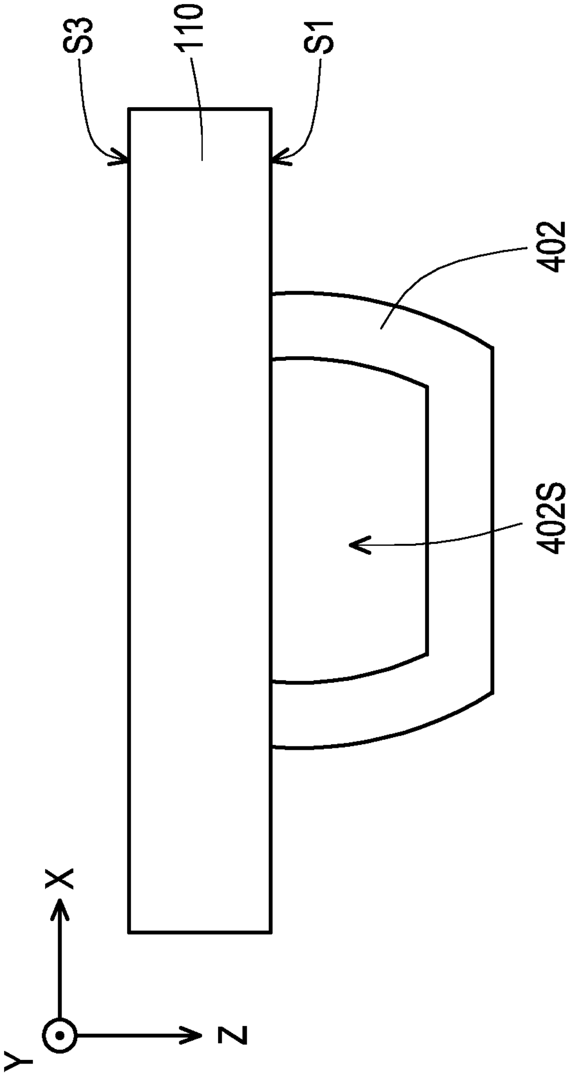
FIG. 7 is a schematic cross-sectional view of a line II-II' in FIG. 6.

FIG. 7 is a schematic cross-sectional view of a line II-II' in FIG. 6. For convenience of description, FIG. 7 merely shows the substrate 110 and the sound wave guiding unit 402, and other components of the electronic device 400 are omitted. The sound wave guiding unit 402 may be disposed on the first surface Si of the substrate 110. The sound wave guiding unit 402 and the substrate 110 may form a closed channel space 402S, and the channel space 402S may be communicated to the separation space DS between the first vibrating unit 120 and the substrate 110 through the gap 132G of the supporting unit 130 (as shown in FIG. 1). When the oscillation layer 124 of the first vibrating unit 120 vibrates under the driving of the conductive layer 122 and the electrode layer 126 to generate the sound wave, the sound wave generated by the first vibrating unit 120 may be guided by the sound wave guiding unit 402 before being emitted to the outside world. Therefore, the sound wave guiding unit 402 may be used to adjust the sound emission effect of the electronic device 400. In this embodiment, the sound wave guiding unit 402 is implemented in a tubular structure. In other embodiments, the sound wave guiding unit 402 may be a component having other cavity structures that may transmit sound.

Figure 8:
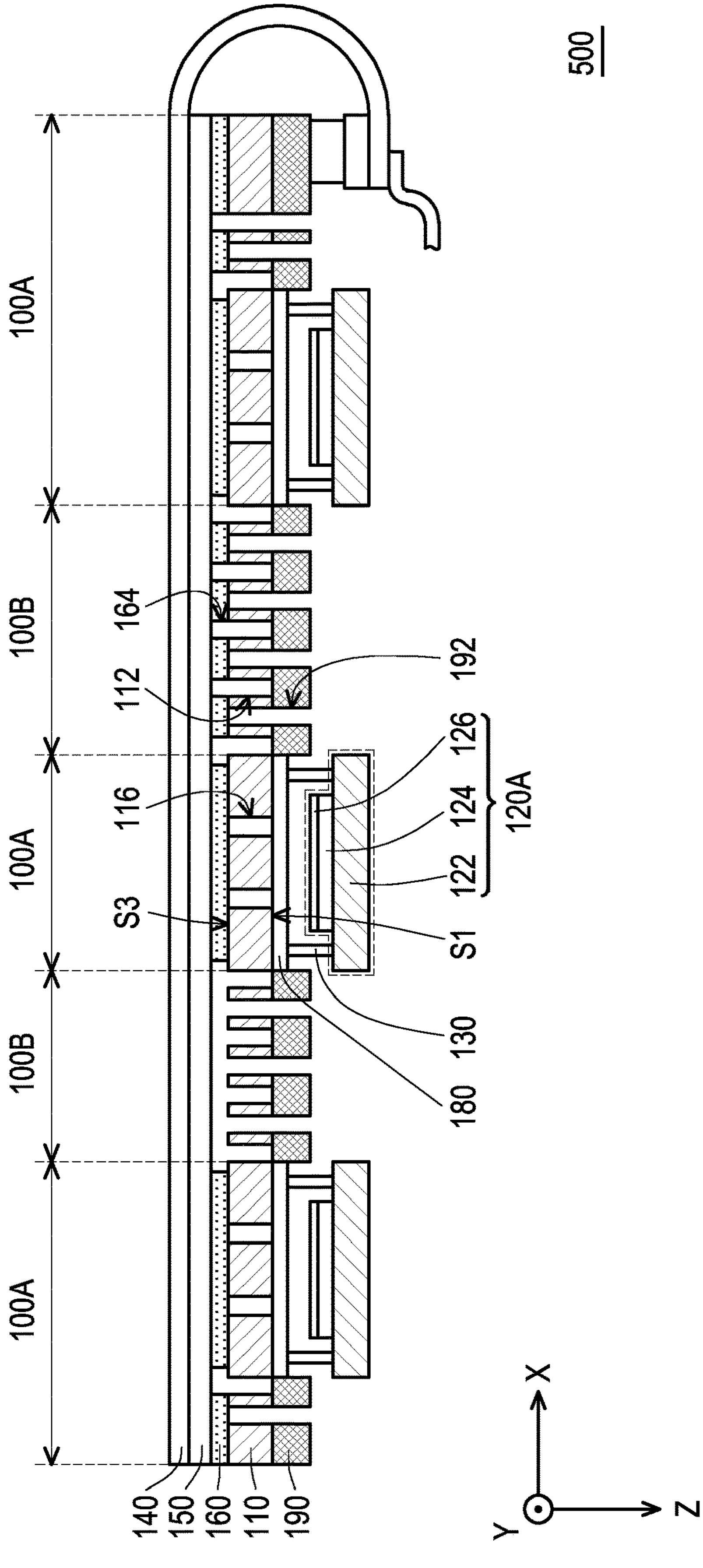
FIG. 8 is a schematic view of an electronic device according to an embodiment of the disclosure.

FIG. 8 is a schematic view of an electronic device according to an embodiment of the disclosure. An electronic device 500 in FIG. 8 is substantially similar to the electronic device 100 in FIG. 1. Therefore, cross-reference may be made between the components and/or structures in the two embodiments that are denoted by the same reference numerals. In FIG. 8, the electronic device 500 includes the substrate 110, the first vibrating unit 120, the supporting unit 130, the display panel 140, the carrier layer 150, the adhesive layer 160, the heat conducting unit 180, and the heat dissipation layer 190. A first vibrating unit 120A, the supporting unit 130, the heat conducting unit 180, and the heat dissipation layer 190 may be disposed on the first surface S1 of the substrate 110. The display panel 140 may be carried by the carrier layer 150 and attached to the third surface S3 of the substrate 110 through the adhesive layer 160. A part of the display panel 140 may be bent to be attached to the first surface S1 of the substrate 110. The specific structures of the above components may be referred to the descriptions of FIG. 1. The first vibrating unit 120A includes at least the conductive layer 122 and the oscillation layer 124, and the conductive layer 122 and the oscillation layer 124 overlap in the Z-axis direction. In addition, the first vibrating unit 120A further includes the electrode layer 126, and the oscillation layer 124 is disposed between the conductive layer 122 and the electrode layer 126. A main difference between the first vibrating unit 120A and the first vibrating unit 120 is that the first vibrating unit 120A has the oscillation layer with a single layer, and the another oscillation layer 124' and the another electrode layer 126' in FIG. 1 are omitted. Here, the structures, materials, and functions, etc. of the conductive layer 122, the oscillation layer 124, and the electrode layer 126 may be referred to the related descriptions of FIG. 1 and any of the foregoing embodiments.

The electronic device 500 has the flat regions 100A and the bending regions 100B that are alternately distributed. In this embodiment, in addition to the recesses 112 in the bending regions 100B, the substrate 110 also has recesses 116 in the flat regions 100A. In some embodiments, the recesses 116 may overlap the first vibrating unit 120 in the Z-axis direction, which helps to transmit the sound wave generated by the first vibrating unit 120 along the Z-axis direction, but the disclosure is not limited thereto. In addition, in this embodiment, the adhesive layer 160 may have multiple recesses 164, and the heat dissipation layer 190 may have multiple through holes 192. The recesses 164 and the through holes 192 are both located in the bending regions 100B. With the configuration of the recesses 164 and the through holes 192, the electronic device 500 is more easily bent in the bending regions 100B. In some embodiments, the electronic device 500 may be applied to the roll-up device.

Figure 9:
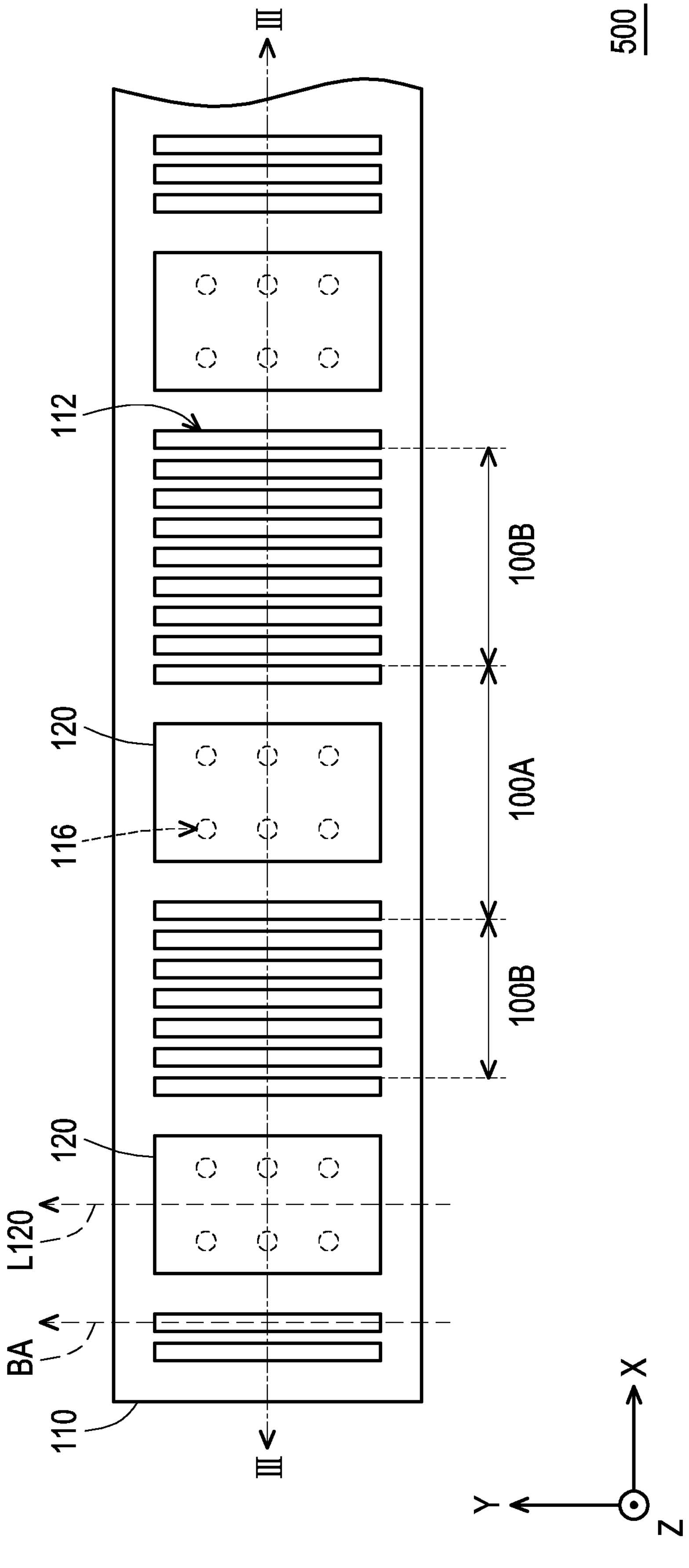
FIG. 9 is a top view of the electronic device in FIG. 8.

FIG. 9 is a top view of the electronic device in FIG. 8. For convenience of description, FIG. 9 only shows some components of the electronic device 500, such as the substrate 110 and the first vibrating unit 120. FIG. 8 may correspond to an embodiment of a cross-sectional structure taken along a line III-III in FIG. 9. Referring to FIG. 8 and FIG. 9, the recesses 112 of the substrate 110 of the electronic device 500 in the bending regions 100B may be elongated and extend substantially along the Y-axis direction. In some embodiments, an extending direction of the recesses 112 may substantially determine an axial direction of the bending axis BA of the electronic device 500. Therefore, the bending axis BA of the electronic device 500 is, for example, substantially parallel to the Y axis. In addition, the first vibrating unit 120 used to generate the sound may also have an elongated shape, such as a rectangle. A long axis L120 of the shape of the first vibrating unit 120 may substantially correspond to the bending axis BA of the electronic device 500. In some embodiments, the long axis L120 may be substantially parallel to a long axis direction of the recesses 112 and correspond to the bending axis BA. In this way, the first vibrating unit 120 is less likely to be damaged because the electronic device 500 is continuously bent or wound around the bending axis BA. In addition, in this embodiment, the recesses 116 located in the flat regions 100A on the substrate 110 may be in a point-like distribution in an area of the first vibrating unit 120 to provide a channel for transmitting the sound wave, but the disclosure is not limited thereto. In some embodiments, the recesses 116 may be omitted.

Based on the above, in the electronic device according to the embodiment of the disclosure, the vibrating unit is deposed on one side of the substrate, so that the electronic device has the function of sound emission. For example, the electronic device may provide both the images and sound. In the electronic device, the supporting unit is used to form the appropriate separation space between the vibrating unit and the substrate, and it is not necessary to significantly increase the volume of the device for the configuration of the sound component. In the electronic device, the recesses may be disposed on the substrate, and the recesses may provide conduction of the sound wave to optimize the sound emission effect of the electronic device. In addition, the recesses on the substrate may allow the electronic device to be bent to be applied to bendable products. When the vibrating units are provided, the structure for sound insulation, such as the recesses on the substrate and/or sound insulation materials filled in the recesses, may be disposed between the vibrating units of the electronic device. Therefore, the sound waves of the vibrating units do not easily interfere with one another and may provide the good sound emission effect. The supporting unit between the vibrating unit and the substrate may be formed by the supporting members spaced apart from one another to transmit the sound waves by the gaps between the supporting members. In some embodiments, the sound wave guiding unit may be disposed corresponding to the gap between the supporting members, so as to adjust a position for sound output, thereby helping to achieve the desired sound output effect.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic device, comprising:

a substrate having a first surface;

a first vibrating unit disposed on the first surface and having a second surface, wherein the second surface faces the first surface; and a supporting unit disposed between the substrate and the first vibrating unit, wherein the first surface and the second surface are separated by a distance through the supporting unit, and the supporting unit comprises a plurality of supporting members, the supporting members surround the first vibrating unit in a top view of the electronic device, and two of the adjacent supporting members are separated by a gap, wherein the distance ranges from equal to or greater than 0.06 mm to equal to or less than 65.4 mm.

2. The electronic device according to claim 1, wherein the distance ranges from equal to or greater than 0.1 mm to equal to or less than 32.7 mm.

3. The electronic device according to claim 1, wherein the first vibrating unit comprises a conductive layer and an oscillation layer, the oscillation layer overlaps the conductive layer, and a ratio of a thickness of the oscillation layer to a thickness of the conductive layer ranges from equal to or greater than 0.5 to equal to or less than 1.

4. The electronic device according to claim 3, wherein the oscillation layer comprises a piezoelectric material.

5. The electronic device according to claim 1, wherein the first vibrating unit is adapted to generate a sound wave.

6. The electronic device according to claim 1, further comprising a sound wave guiding unit disposed on the first surface and corresponding to the gap.

7. The electronic device according to claim 1, further comprising a second vibrating unit disposed on the first surface, wherein the substrate has a recess, and the recess is located between the first vibrating unit and the second vibrating unit in a top view of the electronic device.

8. The electronic device according to claim 7, further comprising a vibration absorbing unit disposed in the recess.

9. The electronic device according to claim 1, further comprising a heat conducting unit disposed between the substrate and the supporting unit.

10. The electronic device according to claim 9, wherein the heat conducting unit comprises metal, metal oxide, boron nitride, or a ceramic material.

11. The electronic device according to claim 1, further comprising a first driving unit and a display panel, wherein the display panel is electrically connected to the first driving unit, the substrate has a third surface, the third surface is opposite to the first surface, and the display panel is disposed on the third surface.

12. The electronic device according to claim 11, wherein the first driving unit is electrically connected to the first vibrating unit.

13. The electronic device according to claim 11, further comprising a circuit board and a second driving unit, wherein the second driving unit is electrically connected to the first vibrating unit, and the first driving unit and the second driving unit are disposed on the circuit board.

* * * * *